United States Patent [19]

Carey

[11] 3,958,813

[45] May 25, 1976

[54] POSITIVE SAFETY LOCKING SYSTEM FOR POWERED OUTRIGGER BEAMS

[75] Inventor: Steve J. Carey, Cedar Rapids, Iowa

[73] Assignee: Harnischfeger Corporation, Milwaukee, Wis.

[22] Filed: Mar. 17, 1975

[21] Appl. No.: 558,926

[52] U.S. Cl. .................................. 280/755; 188/67; 212/145

[51] Int. Cl.[2] ...................... B60S 9/00; B66C 23/80

[58] Field of Search ...................... 188/67; 254/107; 212/145; 280/150.5

[56] References Cited

UNITED STATES PATENTS

| | | | |
|---|---|---|---|
| 1,072,313 | 9/1913 | Conte | 188/67 |
| 1,711,059 | 4/1929 | Marklein | 280/150.5 |
| 2,512,150 | 6/1950 | Geren | 188/67 |
| 2,725,707 | 12/1955 | Peterson | 280/150.5 |
| 3,019,913 | 2/1962 | Bowman | 212/145 |
| 3,164,261 | 1/1965 | Larson | 212/145 |
| 3,181,891 | 5/1965 | Moats | 280/150.5 |
| 3,279,622 | 10/1966 | Person | 212/145 |
| 3,365,214 | 1/1968 | Garnett | 212/145 |

*Primary Examiner*—Albert J. Makay
*Assistant Examiner*—Lawrence J. Oresky
*Attorney, Agent, or Firm*—James E. Nilles

[57] ABSTRACT

Hydraulically powered outrigger beams for cranes including a positive safety locking system for securing the outrigger beams in a fixed downward position to provide stabilization of the vehicle and crane during operation of the crane. The locking system includes a vertically extending interlocking multiple-toothed pawl and ratchet means for locking each of the beams in its downward position. The interlocking ratchet means generally includes a vertically orientated ratchet rack slideable in a rack guide which is secured to the frame, and which rack is engageable with a pivotal multi-toothed pawl means which is spring biased into engagement with the ratchet rack and which functions to wedge said rack between the upper surface of the beam and the frame. The multi-toothed pawl is provided with pneumatic means for forcing it out of engagement with said ratchet rack to allow said outrigger beams to return to an upward position.

10 Claims, 12 Drawing Figures

POSITIVE SAFETY LOCKING SYSTEM FOR POWERED OUTRIGGER BEAMS

BACKGROUND OF THE INVENTION

This invention generally pertains to hydraulically powered and extensible outrigger beams for mobile cranes and is an improvement over the outrigger assembly shown in U.S. Pat. No. 3,073,458 issued Jan. 15, 1963 to Wieschel, and assigned to an assignee common with this application.

SUMMARY OF THE INVENTION

The present invention provides a vehicle mounted crane having outrigger stabilizer beams arranged in criss-cross fashion under the vehicle and having improved positive safety locking means for securing each of the outrigger beams from inadvertent collapse if the hydraulic motor forcing the beams downwardly fails.

The present positive safety locking system generally comprises a vertically operable ratchet means which is designed to function as a wedge member between the vehicle frame and the upper surface of the outrigger beam, once the outrigger beam has been hydraulically forced into its downward position the ratchet means preventing any relative vertical movement between the outrigger beam and the frame.

The improved safety locking system includes vertically slideable ratchet racks having a plurality of teeth and pivotal multi-toothed pawls which are designed to intermesh with the ratchet racks to secure the ratchet racks against upward movement. Each of the ratchet racks is vertically oriented and slideable in a rack guide which is rigidly secured to the frame. Each of the multi-toothed pawls includes a generally vertically oriented arm which is parallel to the opposing rack and which has teeth designed to intermesh with opposing teeth of the ratchet rack so as to prevent upward movement of the rack. Each of the pawls is pivotally mounted to the frame by a pivot pin passing through the upper end of the vertically oriented arm, and further includes a generally horizontally extending lever arm pivotally connected to the end of a piston rod. The piston rod, in turn, extends downwardly into a pneumatic cylinder and is acted upon by a combination of a spring and pneumatic pressure. The spring member functions to bias the piston rod downwardly and to cause the teeth of the vertically extending arm of the multi-toothed pawl to be brought into meshing engagement with those of the ratchet rack. Opposing pneumatic pressure fed into the pneumatic cylinder provides a countervailing upward force on the piston, causing the pawl to be disengaged from the ratchet rack.

In the operation of the positive safety lock system, when the outrigger beams are forced downwardly by their respective hydraulic motors, pneumatic pressure may be fed to the pneumatic cylinders to bias the pawls away from the ratchet racks thereby allowing the weight of the racks to cause them to slide downwardly in the rack guides such that the lower ends of the racks maintain abutting relationship with the upper surfaces of the beams. The arrangement of the ratchet rack with respect to the pawl and the arrangement of the intermeshing teeth of the pawl and rack is such that the pawl will prevent upward movement of the ratchet rack and thereby lock the outrigger beam in the downward position. In order that each outrigger beam may be raised, air pressure may be delivered to the pneumatic cylinders causing the piston therein to force the pawl to pivot away from the rack thereby disengaging the intermeshing teeth and allowing the outrigger beam to force the rack to slide upwardly.

The present invention thus provides an improved means for securely locking the outrigger beams in their downward position to prevent inadvertent collapse of machinery in the event the hydraulic motor forcing the beam downwardly fails. One advantage of the present invention is that the operator may control the locking assembly from the cab or from the front end of the vehicle lower since they are electro-pneumatically operated. Furthermore, the locking assemblies on all four of the outrigger beams may be activated simultaneously by a single electric control operating a central pneumatic pressure source.

These and other objects and advantages of the present invention will appear hereinafter as this disclosure progresses, reference being had to the accompanying drawings.

DESCRIPTION OF A PREFERRED EMBODIMENT

The apparatus of the present invention generally relates to vehicle mounted cranes having hydraulically powered telescoping outrigger beams for stabilizing the vehicles during operation of the crane. The embodiment of the present invention recited herein specifically discloses means to positively lock the telescoping outrigger beams in their downward position to preclude inadvertent collapse of the outrigger structure.

Figure 1:
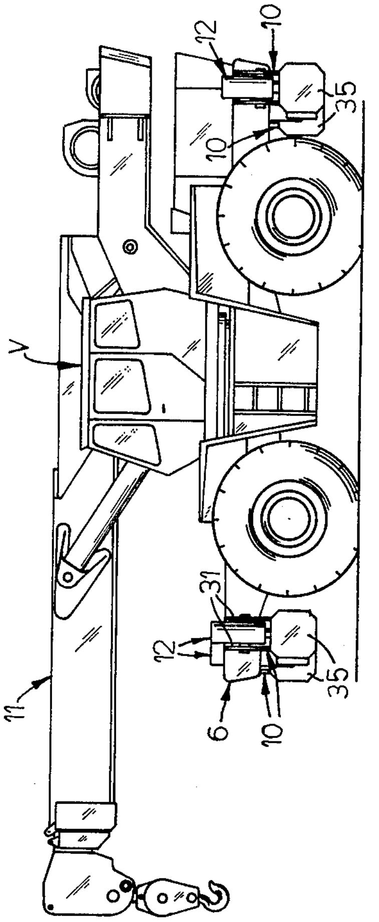
FIG. 1 is a side elevation of a vehicle mounted crane including powered outrigger beams attached to each end of the vehicle frame.
Figure 2:
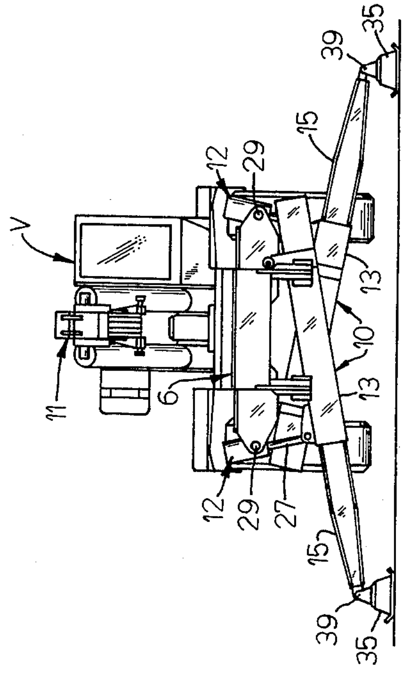
FIG. 2 is an end view of the vehicle shown in FIG. 1 and further showing the powered outrigger beams in a deployed position.
Figure 3:
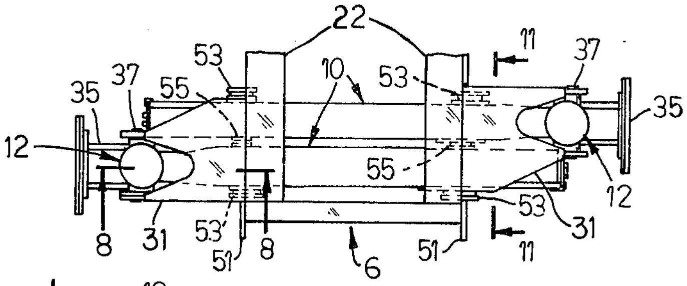
FIG. 3 is a partial top view of one pair of the powered outrigger beams taken along line 3—3 of FIG. 4.

FIGS. 1 and 2 disclose a typical vehicle provided with outrigger beams 10 to be used to stabilize the vehicle during operation of the boom 11 mounted upon the vehicle. The vehicle is provided at each end with a pair of oppositely extending outrigger beams 10 which are pivotally secured to the frame 6 and which can be deployed to assume the position shown in FIG. 2. The pairs of outrigger beams 10 at each end of the vehicle frame 6 are substantially identical and have a structure as shown in FIGS. 2–6. As shown in these figures, each of the outrigger beams 10 is attached to the frame such that it extends across the bottom of the frame and is pivotally connected at one end to the side of the frame opposite its direction of extension, and when deployed in their downward position each pair of beams assumes a criss-cross configuration.

Figure 4:
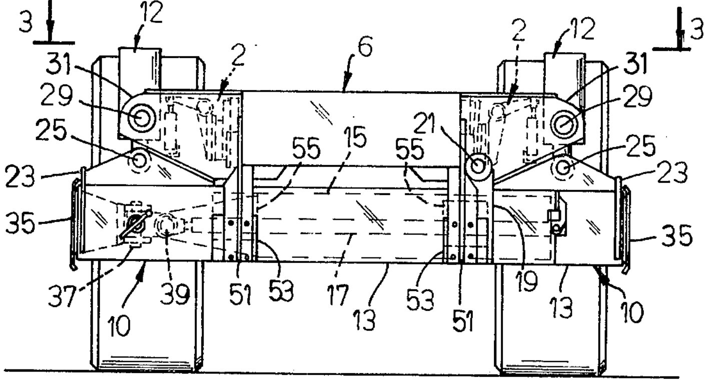
FIG. 4 is an elevation view of a pair of the powered outrigger beams shown in a retracted position.
Figure 5:
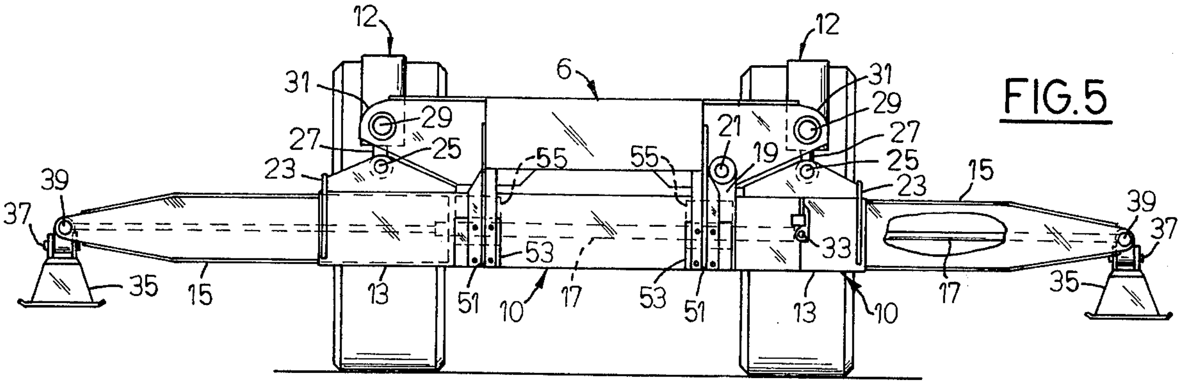
FIG. 5 is a view similar to that of FIG. 4 and showing the outrigger beams in an extended position.
Figure 6:
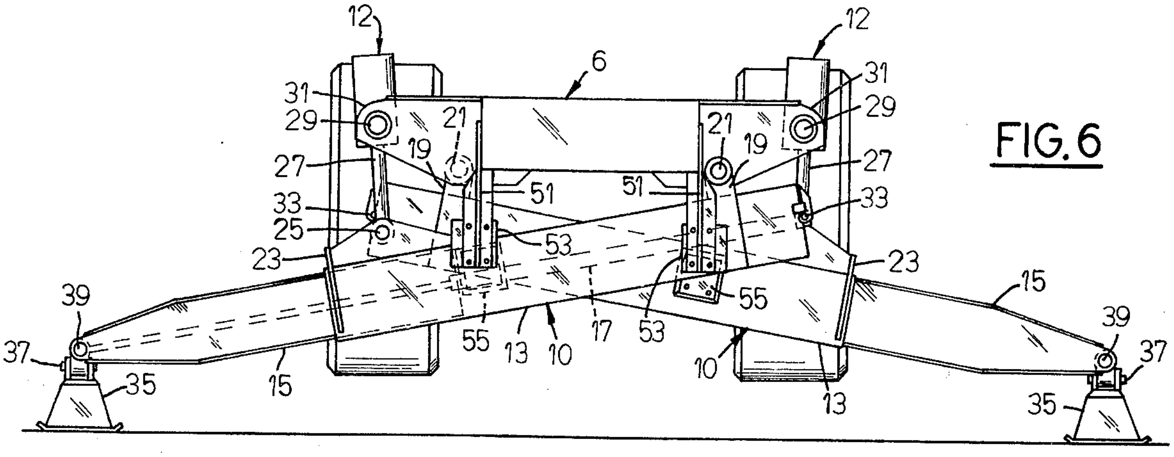
FIG. 6 is a view similar to that of FIGS. 4 and 5 showing the outrigger beams in a fully deployed position.

As shown in FIGS. 2–6, each of the outrigger beams consists of a relatively fixed outer beam section 13 and a telescopically related inner beam section 15 which is selectively extendable and retractable within the outer beam section. Both of these beam sections have a rectangular cross sectional configuration, as shown in FIGS. 3–6, for maximum strength and to provide a housing for a hydraulic motor 17 (FIGS. 4–6). Each of the respective outrigger beam sections is pivotally mounted to the vehicle frame for limited oscillation in a vertical direction. Each of the beams is attached at one end to the frame by a pivot bracket 19 extending downwardly from the frame and is swingable on a pivot pin 21. At its opposite end, the outer beam section 13 is embraced by a yoke 23 which is, in turn, pivotally connected on pin 25 to the piston rod 27 of hydraulic motor 12. The motor 12 is supported on trunnions 29 which are oscillatable between spaced extensions 31 which project laterally from the frame 6.

Telescopic movement is imparted to the inner beam section 15 by hydraulic motor 17 which is located within the hollow cross section of the beams 13 and 15 and which is pivotally connected at one end to the outer beam 13 by a pin 33. Both of the hydraulic motors are double-acting and actuated by conventional hydraulic fluid supplies and control mechanisms.

Each of the telescopic beam sections has at its end a ground engaging foot 35 which is pivotally attached on pivot pins 37 and 39 so as to swing downwardly as shown in FIG. 5 when the inner beam section 15 is extended and can be partially withdrawn into the outer beam section 13 as shown in FIG. 4.

Figure 11:
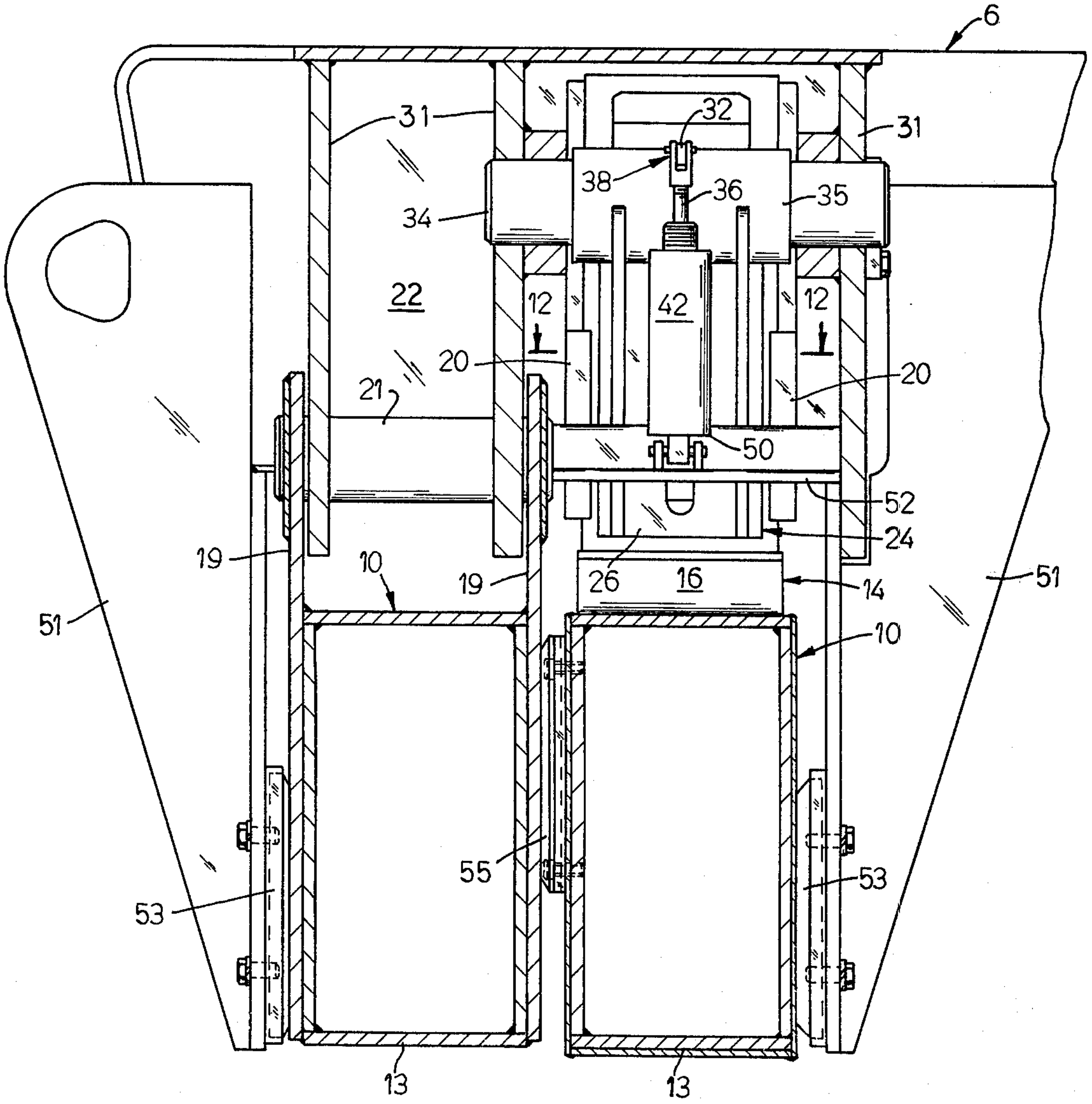
FIG. 11 is an enlarged cross section of a pair of powered outrigger beams taken along line 11—11 in FIG. 3.

As shown in FIGS. 3–6 and more particularly in FIG. 11, each pair of outrigger beams 10 includes a plurality of spacing pads 53 for maintaining the proper positioning of the outrigger beams with respect to each other and with respect to the vehicle frame. The spacing pads are designed to ensure a tight fit between the outrigger beams and to prevent any movement of the vehicle or crane due to flexibility in the outrigger beams or their connection to the vehicle frame. The frame 6 has a plurality of downwardly extending support brackets 51 attached thereto, each supporting a spacing pad 53. The spacing pads 53 are made of such material as to be easily slidable with respect to the surface of the side of the outrigger beam when the beams are pivoted vertically. A spacing pad 55 is also attached to each of the outrigger beams at a point intermediate their length and on the surface of the beams opposing the other beams constituting the pair. As shown in FIG. 6, the spacing pads 53 and 55 are located such that even when the outrigger beams are in their downward position part of the surface area of the spacing pads is in contact with the opposing beam. The spacing pads thus maintain positioning of the outrigger beams and further prevent twisting of the vehicle while it is stabilized by the outrigger.

From the foregoing, it is clear that each of the outrigger beams can be independently operated in such a manner that the vehicle may be stabilized even though it is operated on rough terrain since the hydraulic motors allow varied positions of the beams, and because the beams are independently supported.

In order to insure stabilization of the vehicle and to prevent inadvertent collapse of any one of the outrigger beams in the event of failure of the hydraulic motor it is also desirable to include means to hold the beam in its downward position.

SAFETY LOCKING MEANS

Figure 8:
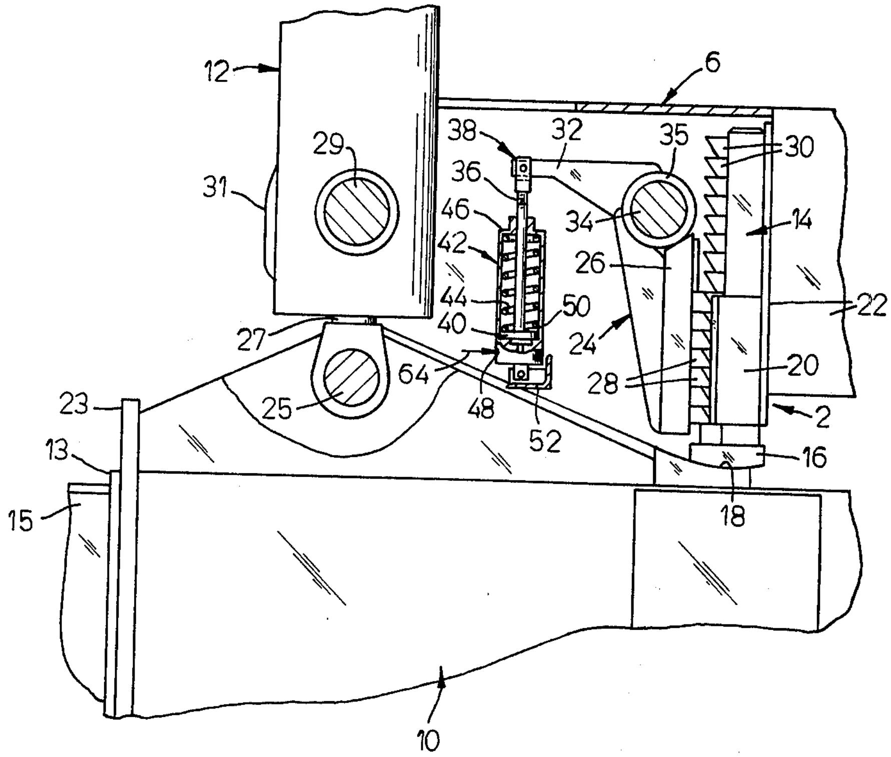
FIG. 8 is an enlarged detail view of the positive safety locking system taken along line 8—8 of FIG. 3.
Figure 9:
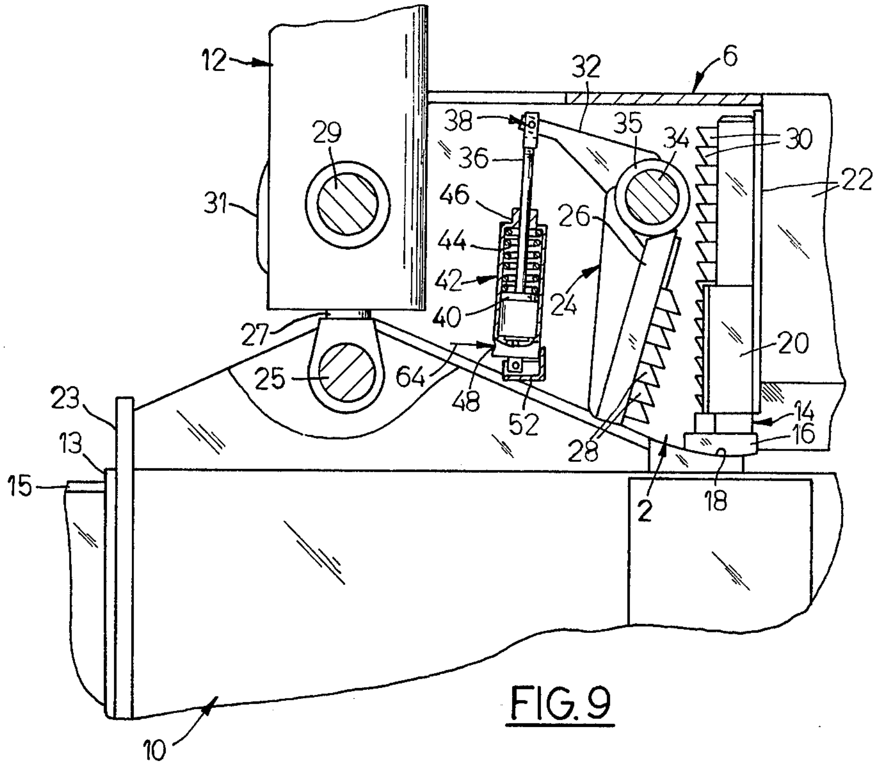
FIG. 9 is a view similar to FIG. 8 showing the positive safety locking system in a disengaged position.
Figure 10:
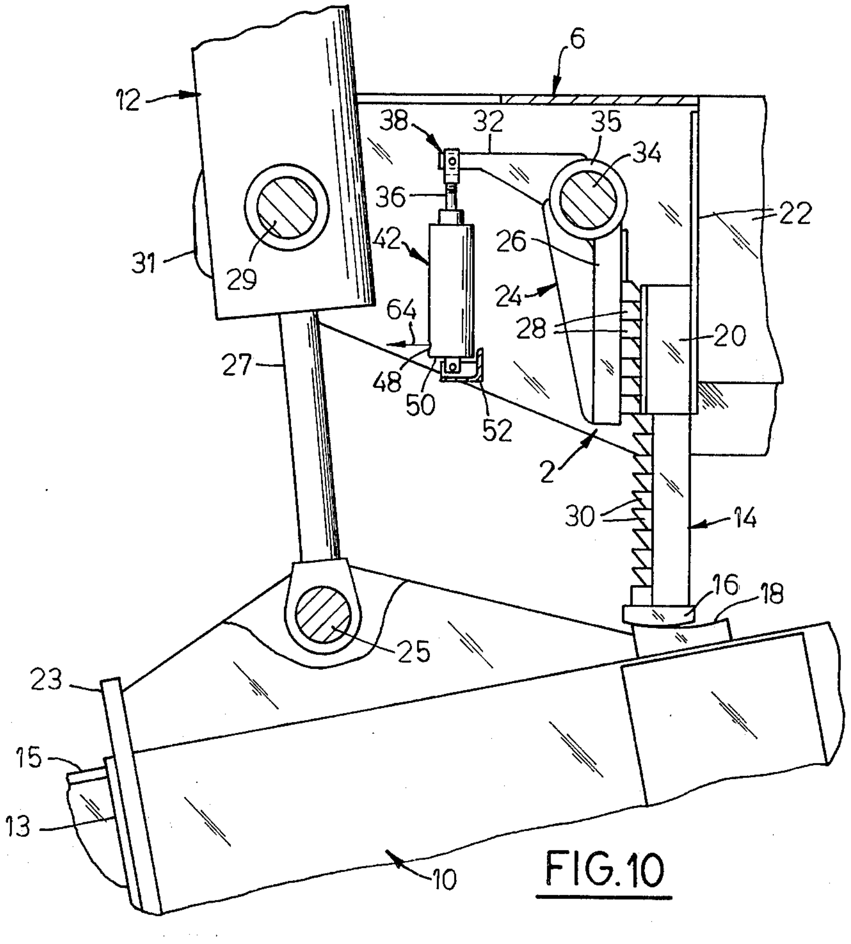
FIG. 10 is a view similar to FIG. 8 showing the positive safety locking system when the outrigger beams are in a deployed position.
Figure 12:
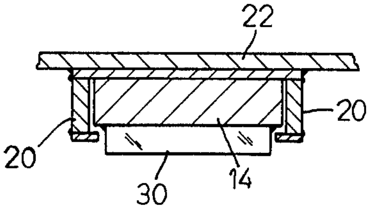
FIG. 12 is an enlarged cross section taken through line 12—12 in FIG. 11.

The specific structure of the safety locking apparatus of the present invention comprising a vertically operable ratchet means 2 which includes a vertically slidable ratchet rack 14 and a spring biased pivotable pawl 24 is shown in detail in FIGS. 8–10. FIG. 8 shows a partial cutaway view of vertically operable ratchet means 2 with the outrigger beam 10 in its upward position and the vertical outrigger cylinder assembly 12 in its retracted position. When the outrigger beam 10 is in this position, the ratchet rack 14 is in an upwardly biased position, as shown, with the ratchet rack foot 16 resting on the surface 18 of the outrigger beam. As shown in FIGS. 8 and 12, the ratchet rack 14 is slidably mounted in rack guide 20 so as to be movable only in the vertical direction, the rack guide 20 being rigidly secured to the frame extensions 22. Attached to the frame extensions 31 is the pivotable pawl member 24. The pawl member 24 includes a downwardly extending vertical member 26 which supports a plurality of pawl teeth 28 which are designed to mesh with ratchet teeth 30 of ratchet rack 14. The pawl 24 also includes a horizontally extending pawl lever arm 32 rigidly secured to the upper end of the downwardly extending vertical member 26, and the pawl 24 is pivotally mounted to the frame extensions 31 by a pivot pin 34 extending through a bore 35 in the pawl at the juncture of the lever arm 32 and the vertical member 26. At its other end the pawl lever arm 32 is pivotally connected to a piston rod 36 by yoke pin assembly 38. The piston rod 36 is in turn connected to a piston head 40 which is received within the pneumatic cylinder 42. The pneumatic cylinder 42 is provided with a pawl biasing spring 44 which is located between the upper wall 46 of the pneumatic cylinder 42 and the piston head 40, the pawl biasing spring 44 functioning to cause said pawl lever arm 32 to apply a torque on the pawl about pivot pin 34 such that the pawl teeth 28 of the downwardly extending vertical member 26 are biased into intermeshing engagement with ratchet teeth 30. The pneumatic cylinder 42 is also supplied with a source of pneumatic pressure through port 48 such that pneumatic pressure may be forced between the lower wall 50 and the piston head 40. Such pneumatic pressure causes piston rod 36 to force the pawl 24 to rotate about pivot pin 34 and out of engagement with the ratchet rack 14 as shown in FIG. 9. As further shown, the pneumatic cylinder 42 is rigidly attached to the frame extensions 31 by cylinder mount 52.

Figure 7:
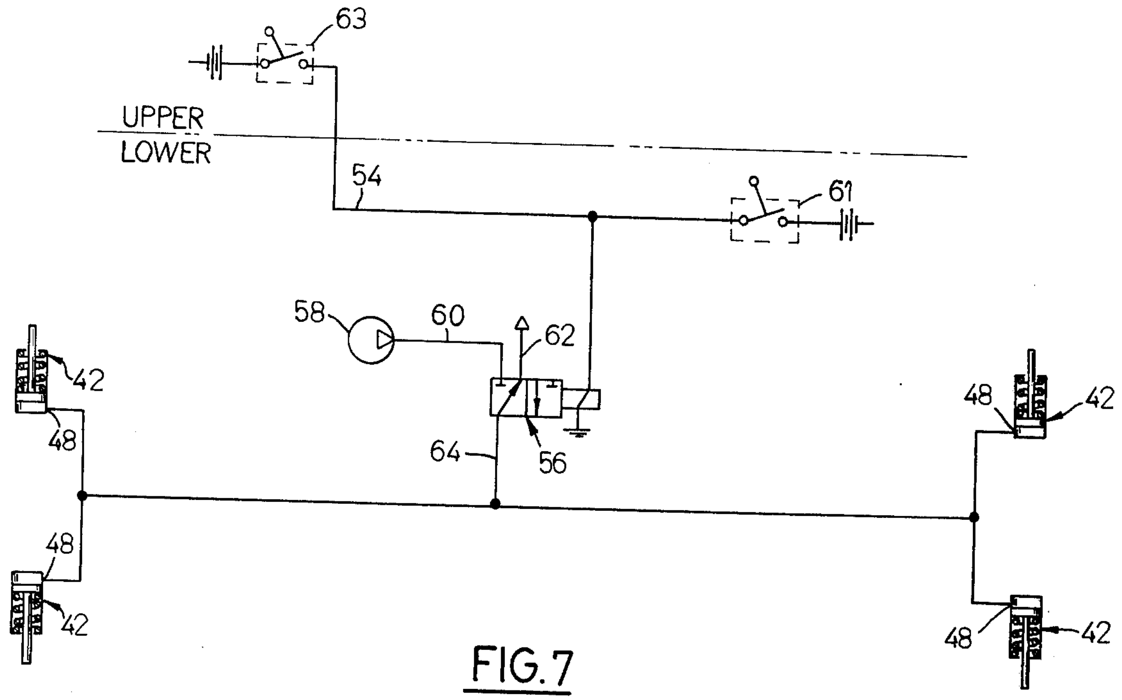
FIG. 7 is a schematic diagram of the pneumatic system used to activate the positive safety locking system of the present invention.

FIG. 7 shows the pneumatic circuit for delivering pneumatic pressure to each of the pneumatic cylinders 42 shown schematically in order to activate the locking assemblies. An electrical main switch 63 operated by the machine operator in the vehicle cab is connected by line 54 to a solenoid operated spring returned valve 56 mounted on the vehicle frame. The solenoid operated valve 56 is operable to control pneumatic pressure from pump 58 through line 60 to line 64 connected to the hydraulic cylinders 42 and to vent the cylinders 42 to an exhaust line 62. As is apparent from FIG. 7, the single switch 63 is operable to control all of the pneumatic cylinders 42 simultaneously. As also shown, an auxiliary switch 61 may be included in such a manner so as to allow the operator to control the safety locking system from the ground rather than from the cab of the vehicle.

OPERATION

When the outrigger beam 10 is forced downwardly by the vertical outrigger cylinder assembly 12 and caused to pivot about pivot pin 21, the outrigger beam 10 moves downwardly away from the ratchet rack foot 16. Pneumatic pressure may be supplied to the pneumatic cylinder 42 to cause the force of spring 44 to be overcome and pawl 24 to be rotated out of engagement with the ratchet rack 14 as shown in FIG. 9, thereby allowing the ratchet rack 14 to slide downwardly in rack guide 20 as shown in FIG. 10.

Once the outrigger beam 10 is in a position to stabilize the crane and the ratchet rack 14 slides downwardly due to its own weight such that ratchet rack foot 16 is in contact with the surface 18, the pneumatic pressure in cylinder 42 may be released and the pawl biasing spring 44 will cause said pawl teeth 28 to securely mesh with the ratchet teeth 30. As can be seen in FIG. 10, such intermeshing of the teeth 28 and 30 will prevent upward movement of the ratchet rack 14. In the event the fluid pressure in vertical outrigger cylinder assembly 12 is released, the weight of the vehicle will cause the frame 31 to place downward force on the ratchet rack teeth 30 through pawl pivot pin 34, downwardly extending vertical member 26 and pawl teeth 28 attached thereto. The forces acting between pawl teeth 28 and ratchet teeth 30, as seen in FIG. 10, create a counterclockwise torque on pawl 24 about pawl pivot pin 34 thereby insuring meshing of the respective teeth 28 and 30. It should also be noted that the shape of the pawl teeth 28 and ratchet teeth 30 is such that, regardless of the vertical position of the outrigger beam, the teeth will engage each other in such a manner that, when hydraulic pressure in cylinder 12 is released, the teeth will slide together into a locked position as shown in FIG. 10.

In order to raise outrigger beam 10 to return it to an inoperative or storage position it is necessary to first activate hydraulic cylinder 12 to release the load on the ratchet rack and pawl and then to provide pneumatic pressure through port 48 to pneumatic cylinder 42 to create an upward force on piston head 40. Such upward force on the piston head 40 causes piston rod 36 to result in a clockwise torque, as seen in FIG. 9, on pawl lever arm 32 and integrally connected downwardly extending vertical member 26. This causes separation of the pawl teeth 28 and ratchet teeth 30. The vertical outrigger cylinder assembly 12 may then pull outrigger beam 10 upwardly causing said ratchet rack 14 to slide upwardly in rack guide 20.

RESUME

The apparatus of the present invention thus provides an improvement over prior art means of locking outrigger beams in a downwardly extending position. The invention allows operation of such locking means without requiring the operator to leave the cab. The invention also provides a positive locking assembly and does so in an uncomplicated and space saving manner.

I claim:

1. Hydraulically extensible outrigger beam apparatus for a wheel supported vehicle having a frame, said apparatus comprising a pair of extensible stabilizer outrigger beams for spanning laterally underneath the frame in criss-cross fashion, each beam having a pivotal connection at one end to one side of the frame, said beams extending laterally beyond the other side of said frame from which they are pivotally connected, a motor for controllably pivoting each of said beams about its pivotal connection to the frame whereby the vertical position of the beam with respect to the frame is readily adjusted, and a vertically positioned interlocking ratchet means operatively connected between said frame and each beam for locking each beam in a fixed position about its pivotal connection to prevent said beam from upward pivotal movement, said ratchet means including a vertically extending rachet rack having a free lower end, said lower end slidably abutting against its respective said beam, said interlocking ratchet means also including a vertically disposed rack guide rigidly secured to said frame and for slidably guiding said rack, cooperating means mounted on said frame and cooperating with said rack to releasably lock said rack, and remotely operated means for operating said cooperating means, whereby said beams are locked in their extended vehicle stabilizing position.

2. A wheel supported vehicle having a frame, a pair of extensible stabilizer outrigger beams spanning laterally underneath the frame in criss-cross fashion, each beam having a pivotal connection at one end to one side of the frame, said beams extending laterally beyond the other side of said frame from which they are pivotally connected, a motor for controllably pivoting each of said beams about its pivotal connection to the frame whereby the vertical position of the beam with respect to the frame is readily adjusted, and a vertically positioned interlocking ratchet means operatively connected between said frame and each beam for locking each beam in a fixed position about its pivotal connection to prevent said beam from upward pivotal movement, said interlocking ratchet means including a vertically disposed rack guide rigidly secured to said frame, a vertically slideable ratchet rack mounted in said guide for vertical sliding relative thereto, a pawl pivotally mounted on said frame, inter-engaging teeth on said pawl and said rack, means for releasably biasing said pawl into toothed engagement with said rack, and means for pivoting said pawl to a position away from said rack, said rack abutting against said beam whereby said pawl and rack are engaged and said beam is held in a downward position by said rack for support of said frame by said beam.

3. The vehicle set forth in claim 2 wherein said means for releasably biasing said pawl includes a spring, and said means for pivoting said pawl to a position away from said rack includes a pneumatic power means.

4. The vehicle of claim 2 where said means for pivoting said pawl to a position away from said rack includes remote operating means.

5. The vehicle of claim 2 wherein said pawl includes a generally downwardly extending arm including said teeth and a generally horizontally extending lever arm rigidly connected at one end to the upper end of the downwardly extending arm and at the other end to a piston and wherein said pawl is pivotably mounted on said frame by a pivot pin passing through the upper end of said downwardly extending arm.

6. The vehicle set forth in claim 5 wherein one end of said piston is received in a pneumatic cylinder which includes a spring for applying a downward force on said piston for causing said pawl to be biased into toothed engagement with said rack.

7. In a vehicle having a wheel supported frame, apparatus comprising an outrigger beam having telescopic sections, said beam spanning laterally underneath the frame, one of said sections having a pivotal connection to the frame on which it is movable primarily vertically, said pivotal connection being at the side of the frame opposite to that side from which the telescopic beam extends, the other section having a ground engaging foot, a first motor for controllably extending and telescoping the respective beam sections and a second motor for controllably pivoting said beam about its pivotal connections with the frame whereby the position of the foot with respect to the frame is readily adjusted, and a vertically operable interlocking ratchet means operatively connected between said frame and beam for locking said beam in a fixed position about its pivotal connection to prevent said beam from upward pivotal movement, said vertically operable interlocking ratchet means being generally vertically disposed and including a vertically disposed rack guide rigidly secured to said frame, a vertically slidable ratchet rack mounted in said guide for vertical sliding relative thereto, a pawl pivotally mounted on said frame, interengaging teeth on said pawl and said rack, means for releasably biasing said pawl into toothed engagement with said rack, and means for swinging said pawl to a position away from said rack, said rack abutting against said beam whereby said pawl and rack are engaged and said beam is held in a downward position by said rack for support of said frame by said beam.

8. The vehicle set forth in claim 7 further characterized in that said frame has at least a pair of said beams pivotally connected thereto on opposite sides and extending laterally beneath said frame in criss-cross relationship.

9. The vehicle set forth in claim 7 further characterized in that said frame has a plurality of said telescoping outrigger beams, each being operatively connected to a vertically operable interlocking ratchet means, and including pneumatic power means for simultaneously controlling the means for swinging said pawl to a position away from said rack of each of said interlocking ratchet means.

10. Hydraulically extensible outrigger beam apparatus for a wheel supported vehicle having a frame, said apparatus comprising a pair of extensible stabilizer outrigger beams for spanning laterally underneath the frame in criss-cross fashion, said beams extending laterally beyond the other side of same frame from which they are pivotally connected, a motor for controllably pivoting each of said beams about its pivotal connection to the frame whereby the vertical position of the beam with respect to the frame is readily adjusted, and a vertically positioned interlocking ratchet means operatively connected between said frame and beam for locking each beam in a fixed position about its pivotal connection to prevent said beam from upward pivotal movement and means for releasably locking said ratchet means including a vertically disposed rack guide rigidly secured to said frame, a vertically slideable ratchet rack mounted in said guide for vertical sliding relative thereto, a pawl pivotally mounted on said frame, interengaging teeth on said pawl and said rack, means for releasably biasing said pawl into toothed engagement with said rack, and means for swinging said pawl to a position away from said rack, said rack abutting against said beam whereby said pawl and rack are engaged and said beam is held in a downward position by said rack for support of said frame by said beam.

* * * * *